(12) United States Patent
Dairon et al.

(10) Patent No.: US 8,418,304 B2
(45) Date of Patent: Apr. 16, 2013

(54) APPARATUS FOR CLEANING TURFED GROUND

(75) Inventors: Michel Maurice Dairon, Pruille l'eguille (FR); Jose Alain Loyer, Mansigne (FR)

(73) Assignee: SAS Dairon, La Pincenardiere Mulsanne (FR)

( * ) Notice: Subject to any disclaimer, the term of this patent is extended or adjusted under 35 U.S.C. 154(b) by 299 days.

(21) Appl. No.: 12/934,664

(22) PCT Filed: Apr. 1, 2009

(86) PCT No.: PCT/FR2009/050555
§ 371 (c)(1),
(2), (4) Date: Sep. 27, 2010

(87) PCT Pub. No.: WO2009/136025
PCT Pub. Date: Nov. 12, 2009

(65) Prior Publication Data
US 2011/0010879 A1    Jan. 20, 2011

(30) Foreign Application Priority Data
Apr. 3, 2008   (FR) ..................................... 08 52228

(51) Int. Cl.
*A46B 15/00*    (2006.01)
(52) U.S. Cl.
USPC ..................................... 15/83; 15/82; 15/79.2
(58) Field of Classification Search .................... 15/21.1, 15/83, 84, 82, 79.1, 79.2, 86, 105
See application file for complete search history.

(56) References Cited

U.S. PATENT DOCUMENTS

| | | | |
|---|---|---|---|
| 2,448,328 A | 8/1948 | Russell | |
| 3,513,498 A | 5/1970 | Bennich | |
| 3,872,657 A | 3/1975 | Ramacher et al. | |
| 4,914,774 A | 4/1990 | Sheehan et al. | |
| 5,742,968 A | 4/1998 | Nicholson | |
| 2011/0247152 A1 | 10/2011 | Dairon et al. | |

FOREIGN PATENT DOCUMENTS

GB    2465304 A    5/2010

*Primary Examiner* — Shay Karls
(74) *Attorney, Agent, or Firm* — Leydig, Voit & Mayer, Ltd.

(57) ABSTRACT

A turf cleaning machine includes a bowed plate swept by a cylindrical plate. The bowed plate, when successively swept by a cylindrical brush, catches waste not ejected by the brush into a collecting pan to ensure collection of the waste. The waste is picked up a second time for ejection from the brush into the pan.

5 Claims, 7 Drawing Sheets

APPARATUS FOR CLEANING TURFED GROUND

FIELD OF THE INVENTION

The present invention concerns a cleaning apparatus, in particular for cleaning turfed ground.

It is applicable to the field of green spaces, such as golf courses, football fields or others.

BACKGROUND OF THE INVENTION

French patent application filed in the applicant's name on Sep. 7, 2007 under number 07 57 429 describes an apparatus for cleaning turfed ground comprising a chassis on which are arranged a rear roller than can roll on the turfed ground and a front cylindrical brush parallel to the roller, rotatably mounted in the opposite direction of rotation from the roller and making it possible to pick up the waste present on the turfed ground to project it into a collecting pan integral with the chassis behind it.

The cylindrical brush is in contact with the rear roller to clean the latter by ridding it of the waste deposited on the perimeter of the roller and that is projected by the brush into the collecting pan.

This cleaning apparatus thus makes it possible to clean both the ground and the roller situated downstream of the cylindrical brush in relation to the direction of movement of the apparatus.

However, it happens that with the relatively high rotational speed of the cylindrical brush, some of the waste taken from the ground and/or on the rear roller is retained by the brush bristles and is not ejected by the centrifugal force into the collecting pan, and is therefore projected on the ground downstream of the rear roller. In this way, the ground is not totally rid of all refuse.

SUMMARY OF THE INVENTION

The present invention aims to offset the aforementioned drawback of the applicant's cleaning apparatus.

To that end, the invention proposes a cleaning apparatus particularly for turfed ground and that is characterized in that it comprises a chassis on which are arranged, in relation to the direction of movement of the apparatus, a front roller able to roll on the turfed ground and a rear cylindrical brush parallel to the roller, rotatably mounted in the opposite direction of rotation from the roller and making it possible to pick up waste present on the turfed ground to project it into a collecting pan integral with the chassis and situated behind the cylindrical brush, in that the cylindrical brush is in contact with the front roller to clean the latter part by ridding it of the waste deposited on the roller and projected by the brush into the collecting pan, in that it also comprises, integral with the chassis, a bowed plate with the concavity thereof facing the cylindrical brush behind the latter part extending substantially over the entire width of the cylindrical brush and in that the bowed plate can be swept by the cylindrical brush and is capable, during the successive sweepings by the cylindrical brush, of picking up waste not ejected by the cylindrical brush into the collecting pan and ensuring the transfer thereof by the cylindrical brush toward the bottom of the bowed plate so that it is then picked up and ejected by the brush into the collecting pan.

Preferably, the bowed plate is mounted freely pivoting in relation to the chassis around the longitudinal axis of the cylindrical brush so as to continuously rest on the ground by gravity.

Advantageously, the bowed plate is in the form of a cylindrical cap concentric to the cylindrical brush.

The lower portion of the bowed plate is curved substantially in an elongated V whereof the lower free branch extending behind the bowed plate includes an upwardly curved end portion such that the bowed plate rests on the ground by the rounded connecting edge between the lower branch and the end portion curved toward the top of the bowed plate.

The bowed plate extends over a height from the ground such that its upper edge is situated approximately below the lower edge of the opening of the collecting pan through which the waste is ejected.

The bowed plate includes two side end walls pivotably mounted to the chassis around the longitudinal axis of the cylindrical brush.

The cylindrical brush can be adjusted to a working height relative to the chassis along a bowed trajectory whereof the center is situated on the longitudinal axis of the front roller.

The front roller and the rear cylindrical brush extend transversely to the direction of movement of the apparatus.

The bowed plate and its side walls are made of sheet metal.

The cleaning apparatus is hitched to the rear of a driving tractor or a ground dethatching or coring machine itself hitched to the rear of a driving tractor.

BRIEF DESCRIPTION OF DRAWING FIGURES

The invention will be better understood, and other aims, features, details and advantages thereof will appear more clearly in the explanatory description that follows in reference to the appended diagrammatic drawings provided solely as examples illustrating an embodiment of the invention and in which.

DETAILED DESCRIPTION

Figure 1:
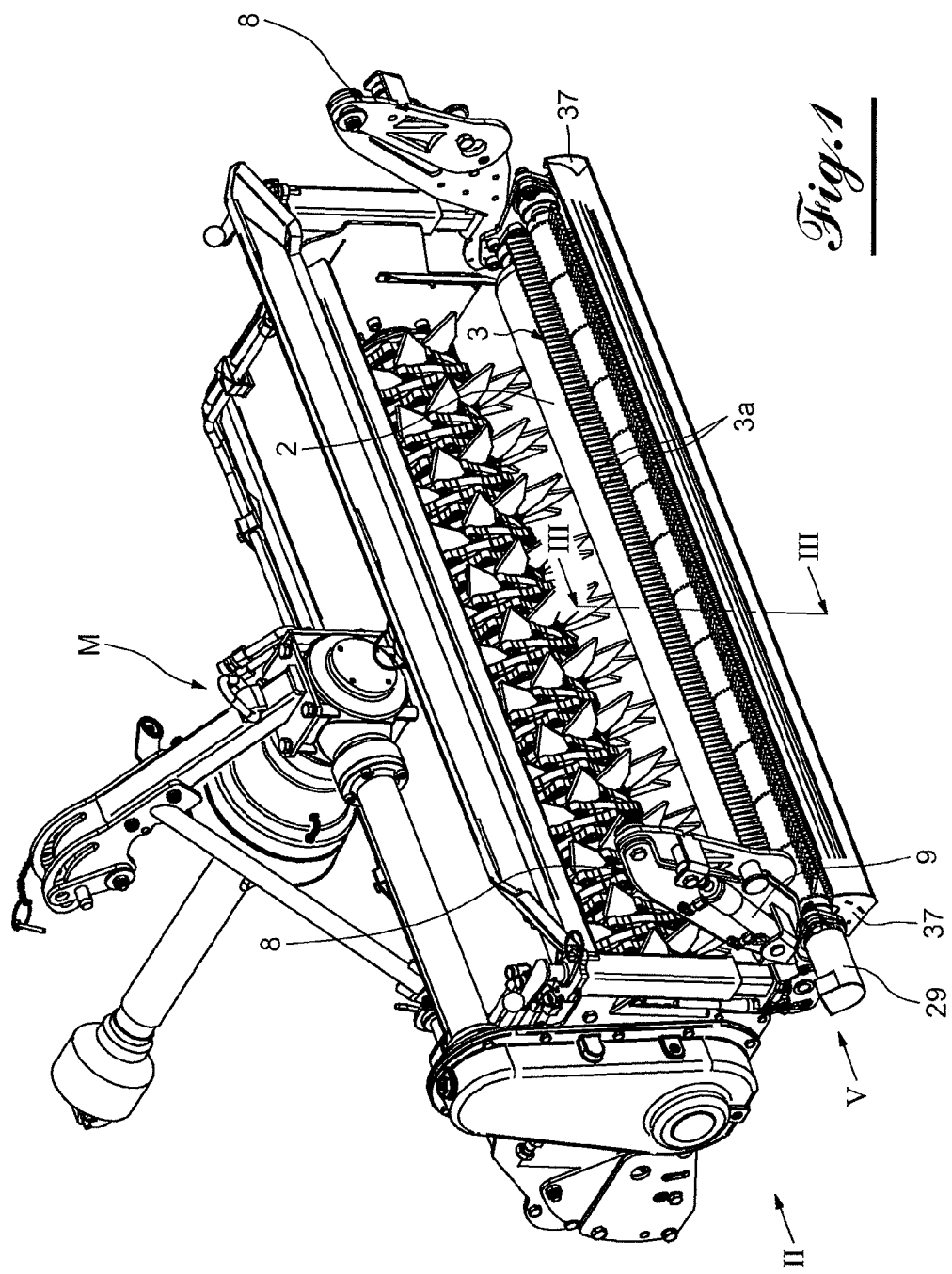
FIG. 1 is a perspective view of a cleaning apparatus for turfed ground according to the invention.
Figure 2:
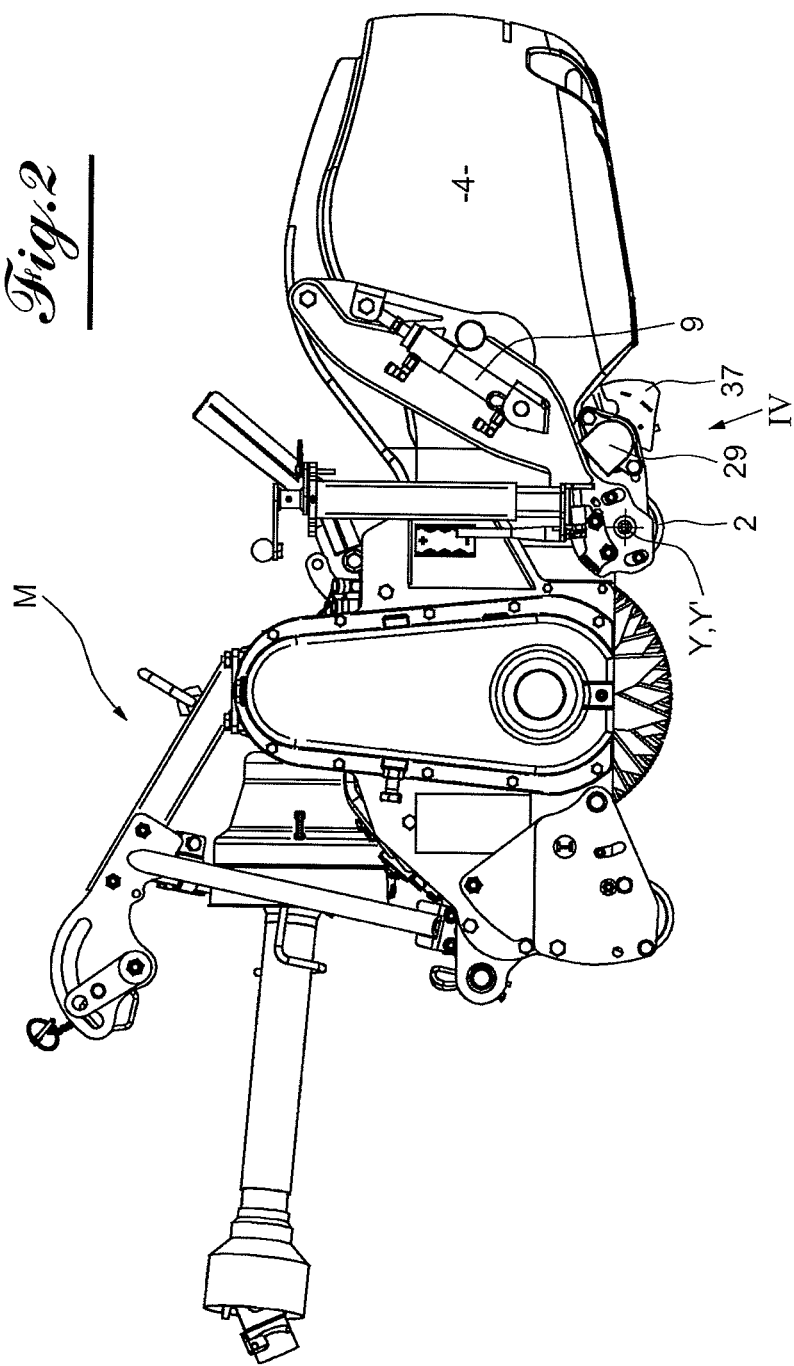
FIG. 2 is a side view along arrow II of the apparatus of FIG. 1.

In reference to the Figures, the apparatus of the invention making it possible to clean in particular turfed ground comprises a chassis 1 on which are arranged, in relation to the direction of travel or work F1 of the apparatus, a front or upstream roller 2 able to roll on the turfed ground to serve as support on the ground for the apparatus and a rear or downstream cylindrical brush 3 parallel to the roller 2 extending transversely to the direction of travel F1 of the apparatus.

The cylindrical brush 3 is rotatably mounted on the chassis 1 in the opposite direction of rotation from the roller 2. This brush makes it possible to pick up waste present on the turfed ground to project it rearward by the centrifugal force into a recovery or collecting pan for waste 4 integral with the chassis behind the cylindrical brush 3.

The cylindrical brush 3 is in continuous contact with the front roller 2 to constantly clean the perimeter of that roller by ridding it of the waste deposited on the roller and that is projected by the brush 3 into the collecting pan 4. The cylindrical brush 3 can be adjusted to a working height relative to the ground along a bowed trajectory whereof the center A is situated on the longitudinal axis of the roller 2 as symbolized by the double arrow F2 in FIG. 3. This working height of the brush 3 depends on the height relative to the ground of the lawn to be cleaned such that the bristles 3a of the brush 3 can penetrate the lawn without touching the ground.

In operation, the cylindrical brush 3 picks up, by brushing, the waste D present in the lawn between the roller 2 and the brush 3 and, at the same time, the brush 2 continuously cleans the front roller 2 to prevent any deposition of waste on the perimeter of said roller, thereby optimizing the picking up of the waste because the working height of the brush 3 relative to the ground is kept constant. The waste D picked up off the ground and on the roller 2 is projected by the bristles 3a of the brush 3 upward and rearward by the centrifugal force to be ejected into the collecting pan 4.

The cleaning apparatus can be hitched to the rear of a machine M designed to dethatch the ground, itself hitched to the rear of a driving tractor, not shown, but it is understood that this apparatus can be hitched to the rear of any other machine for working the ground, such as, for example, a ground coring machine, or simply to the rear of a driving tractor by a traditional three-point fastening.

The chassis 1 of the cleaning apparatus comprises two rigid side flanges 6 arranged parallel to the direction of travel F1 of the assembly formed by the machine M and the cleaning apparatus and are fastened respectively to the inner faces of two side walls 7 integral with the chassis of the machine M behind it.

One flange 6 and one side wall 7 situated on a same side are twinned in their upper portions to form a rigid arm 8 extending upward behind the cleaning apparatus. The collecting pan 4 is removably fastened to the two side arms 8. Each arm 8 is provided on the outer face of the corresponding side wall 7 with a pneumatic or hydraulic cylinder 9 able to be actuated to tilt the collecting pan 4 in relation to the chassis 1 of the cleaning apparatus in order to empty the waste D collected in that pan.

The front roller 2 is mounted freely rotating around its longitudinal axis between the two side flanges 6. More specifically, each of the ends of the roller 2 is rotatably mounted in at least one ball or needle type bearing, not shown, fastened in a bearing support 10 in the form of a substantially diamond-shaped plate fastened by fastening screws 11 to the inner face of a support plate 12 of the rear cylindrical brush 3 and that can pivot around the longitudinal axis Y-Y' of the roller 2.

The heads 13 of the two fastening screws 11 of the bearing support 10 to the support plate 12 of the cylindrical brush 3 are housed in two bowed lumens 14, respectively, made through each rigid flange 6. The centers of the radii of curvature of the two bowed lumens 14 are situated on the longitudinal axis Y-Y' of the roller 2, which extends perpendicular to the flanges 6, and are symmetrical to said axis.

Each bearing support 10 includes a bush 15 coaxial to the longitudinal axis Y-Y' of the roller 2, passing through the support plate 12 of the brush 3 and the corresponding flange 6 such that the assembly formed by the bearing support 10 and the plate 12 can turn by a determined angular value relative to the flange 6 around the longitudinal axis Y-Y' when the working height of the cylindrical brush 3 is adjusted.

Figure 5:
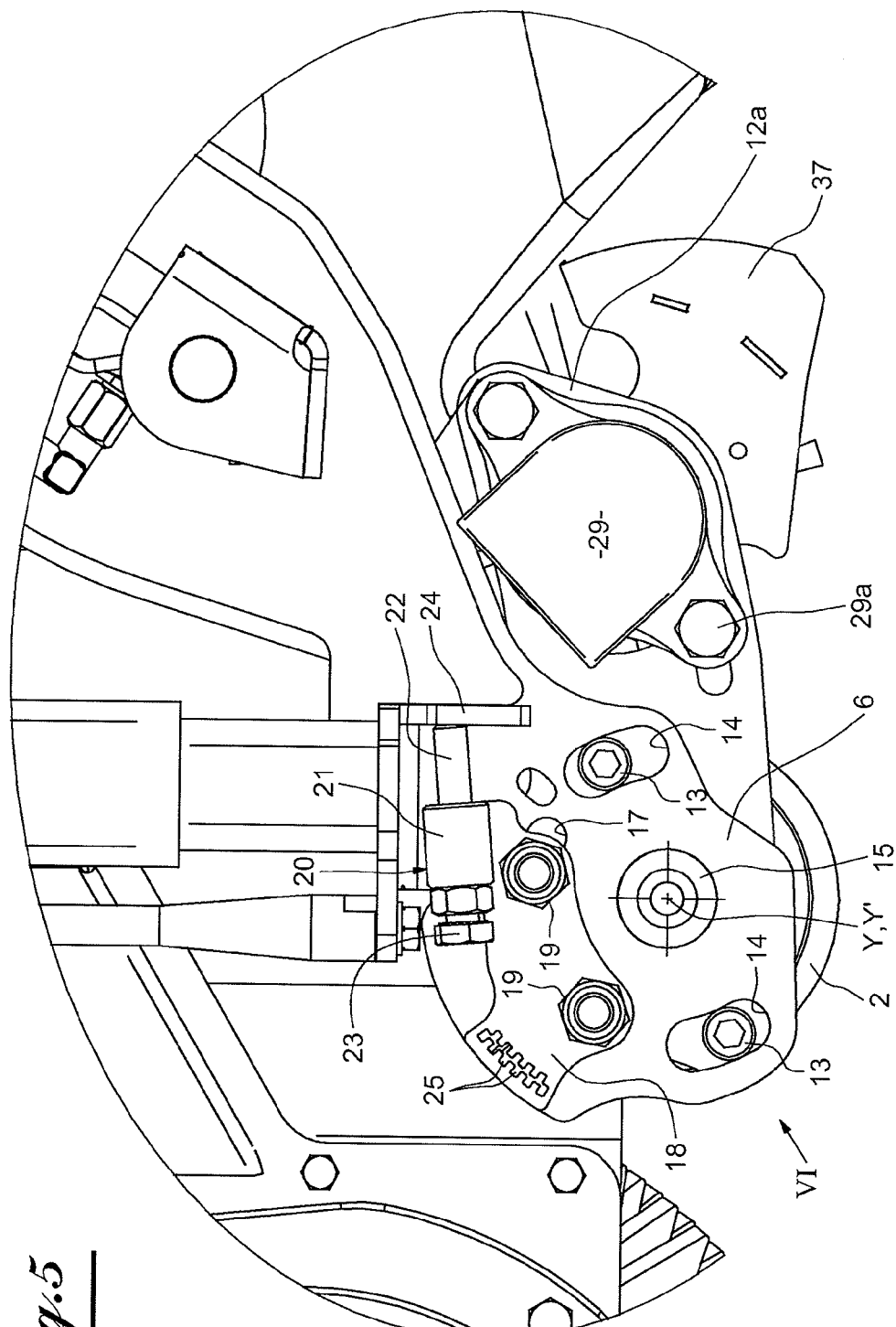
FIG. 5 is an enlarged side view along arrow V of FIG. 1.
Figure 6:
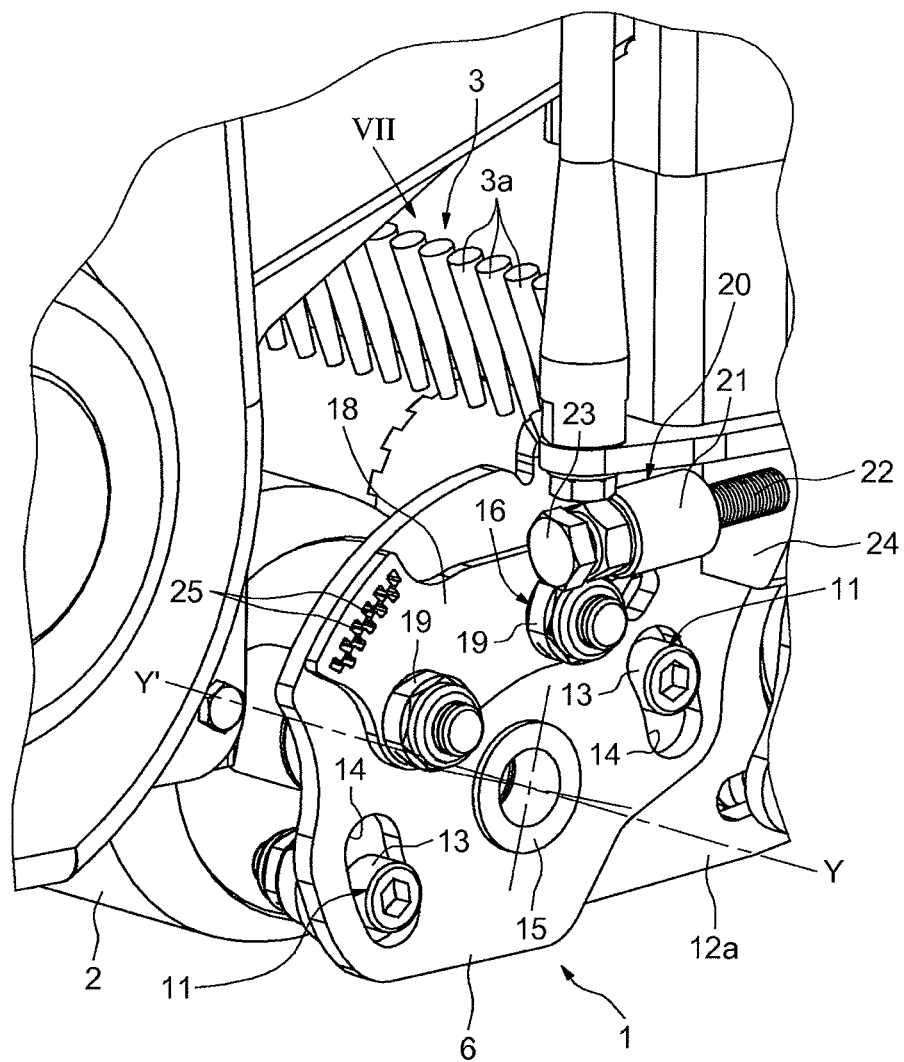
FIG. 6 is a perspective view along arrow VI of FIG. 5.

Each of the support plates 12 of the cylindrical brush 3 is normally fastened to the corresponding flange 6 via two fastening bolts 16 respectively passing through two piercings of the plate 12 and two bowed lumens 17 formed through the corresponding flanges 6 and only one of which is partially visible in FIG. 5. The two lumens 17 are situated on a same circumference and the centers of their radii of curvature are situated on the axis Y-Y' of the roller 2.

A plate 18 is fastened to the outer face of a portion of each flange 6, not covered by the corresponding wall 7, by the two bolts 16 passing respectively through two piercings of the plate 18 that can be blocked with the plate 12 at the flange 6 by tightening the nuts 19 of the bolts 16 in a determined position of the two bowed lumens 17.

A means 20 is fastened to each of the plates 18 and enables the adjustment of the working height of the cylindrical brush 3.

Each adjusting means 20 comprises a sleeve 21 with an inner tapping fastened, for example by welding, to the outer face of the corresponding plate 18, and a screw 22 passing through the sleeve 21 and whereof the end opposite its head 23 bears on a stop plate 24 integral with the chassis 1 of the cleaning apparatus.

Each plate 18 comprises a plurality of graduations 25 formed by small windows that can be formed selectively opposite a fixed reference point, not shown, integral with the outer face of the corresponding flange 6 and so as to indicate the working height of the cylindrical brush 3.

The two plates 12 include two parallel arms 12a extending behind the roller 2 toward the collecting pan 4 and between which the cylindrical brush 3 is rotatably mounted, which is thus situated opposite a knife 28 rotor 27 for dethatching the ground of the machine M.

The cylindrical brush 3 is driven in rotation by an electric or hydraulic engine 29 fastened by bolts 29a to the outer face of one of the support arms 12a of the brush 3 coaxially to the longitudinal axis thereof so as to drive the brush 3 in the opposite direction of rotation from that of the roller 2 during movement of the machine M along the direction F1.

To adjust the working height of the cylinder brush 3, an operator first loosens both nuts 19 of the fastening bolts 16 then, using a key, acts on each screw 22 head 23 to drive each of the screws 22 in one direction or the other to move the bolts 16 in their respective curvilinear lumens 17 in the corresponding direction so as to simultaneously move each plate 18 and each support plate 12 of the cylindrical brush 3 around the longitudinal axis Y-Y' of the roller 2. In this way, the cylindrical brush 3 is moved in relation to the flanges 6 and, as a result, to the roller 2, along the curved path symbolized by the double arrow F2 in FIG. 3 and center path situated on the Y-Y' of the roller 2.

It should be noted that during pivoting of the cylindrical brush 3 around the axis Y-Y', the heads 13 of the fastening screws 11 move in their respective curvilinear lumens 14 of the flanges 6 with concomitant pivoting of the bearing supports 10 relative to the flanges 6 via bushes 15.

The pivoting of the cylindrical brush 3 around the axis Y-Y' therefore makes it possible to position that brush at a working height depending on the height of the lawn to be cleaned.

Once the adjustment is done with the visual indication of the working height of the brush 3 by the graduations 25, the operator again tightens the two nuts 19 to lock the pairs of plates 18, 12 to their respective flanges 6 and, as a result, lock the cylindrical brush 3 at its working height.

The pivoting of the cylindrical brush 3 around the axis Y-Y' of the roller 2 makes it possible to keep the distance or frictional pressure of the bristles 3a of the brush 3 constant on the roller 2 to ensure cleaning thereof, regardless of the working height of the brush 3 relative to the ground.

The cleaning apparatus also comprises, integral with the chassis 1, a bowed plate 30 with the concavity thereof facing the cylindrical brush 3 behind the latter part and extending substantially over the entire width of the cylindrical brush 3.

The bowed plate 30 is in the form of a cylindrical cap concentric to the cylindrical brush 3, i.e. the radius of curvature of the cylindrical cap is centered on the longitudinal axis X-X' of the cylindrical brush 3.

The bowed plate 30 has a lower portion 31 that is curved substantially in an elongated or horizontal V whereof one 32 of the walls forming branches is an extension of the bowed plate 30 and the other lower free branch 33, which extends behind the bowed plate 30, comprises an upwardly curved end portion 34 such that an outwardly rounded edge 35, extending transversely to the direction of travel F1 of the machine M, is defined between the branch 33 and the curved portion 34. This rounded edge 35 is designed to bear continuously on the ground during the movement of the machine M.

The bowed plate 30 has an upper portion opposite the lower branch 33 extended by a wall 36 curved upwardly behind the bowed plate 30 and the assembly formed by the bowed plate 30 and the curved walls 31, 36 extend from the ground by a height such that the free edge of the curved wall 36 is situated approximately below and overhanging the lower edge 4a defining the inlet opening of the waste D into the collecting pan 4.

The bowed plate 30 and its curved walls 31, 36 include two end side walls 37 mounted freely pivoting, at their ends opposite the bowed plate 30, relative to the chassis 1 around the longitudinal axis X-X' of the cylindrical brush 3 so as to rest continuously by gravity on the ground by the rounded connecting edge 35 between the curved walls 33, 34.

Figure 7:
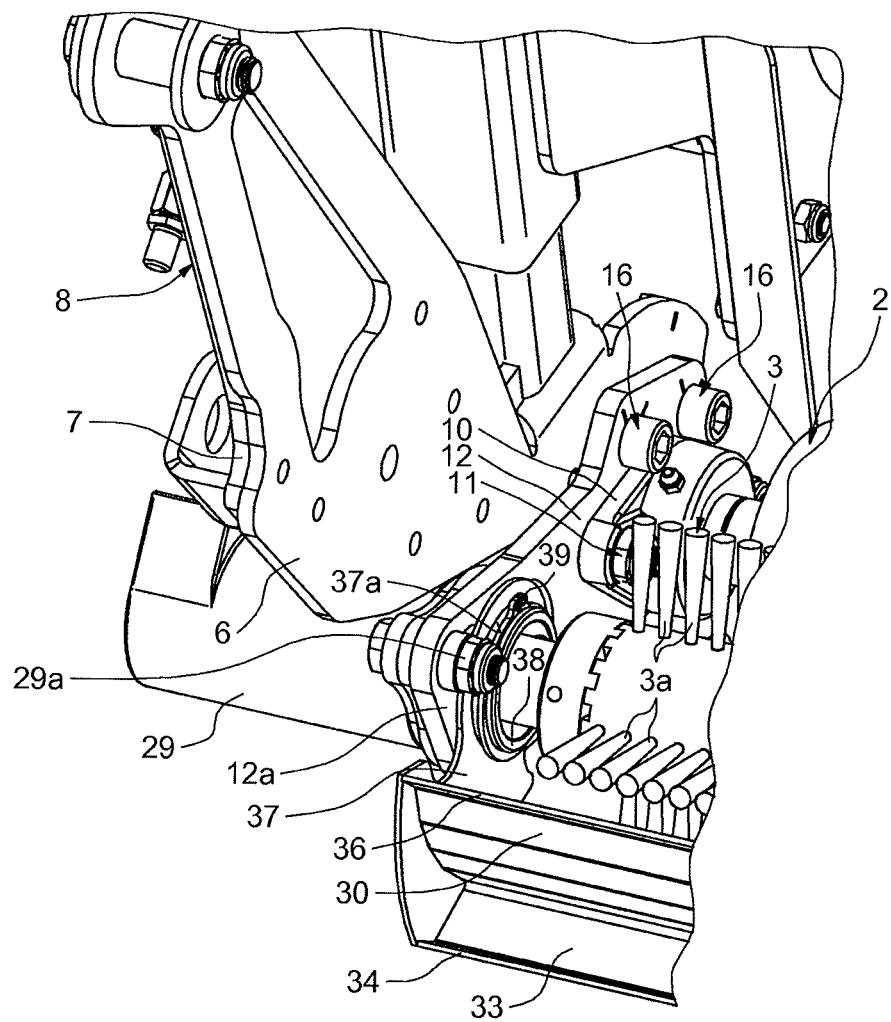
FIG. 7 is a partial perspective view along arrow VII of FIG. 6.

More precisely, and as will better emerge from FIG. 7, each side wall 37 includes a piercing 37a concentric to a cylindrical sleeve 38 integral with the inner face of the corresponding support plate 12 of the cylindrical brush 3 such that the side wall 37 can pivot freely around the sleeve 38. The side plate 37 is axially maintained on the sleeve 38 by an outer stop ring 39 such as a circlips.

The bowed plate 30 is arranged relative to the cylindrical brush 3 such that the end of the bristles 3a of the brush 3 successively sweep, during operation, the bowed inner face facing the brush of the plate 30.

The bowed plate 30 and its curved walls 31, 36 as well as the side walls 37 can be made of sheet metal.

Figure 3:
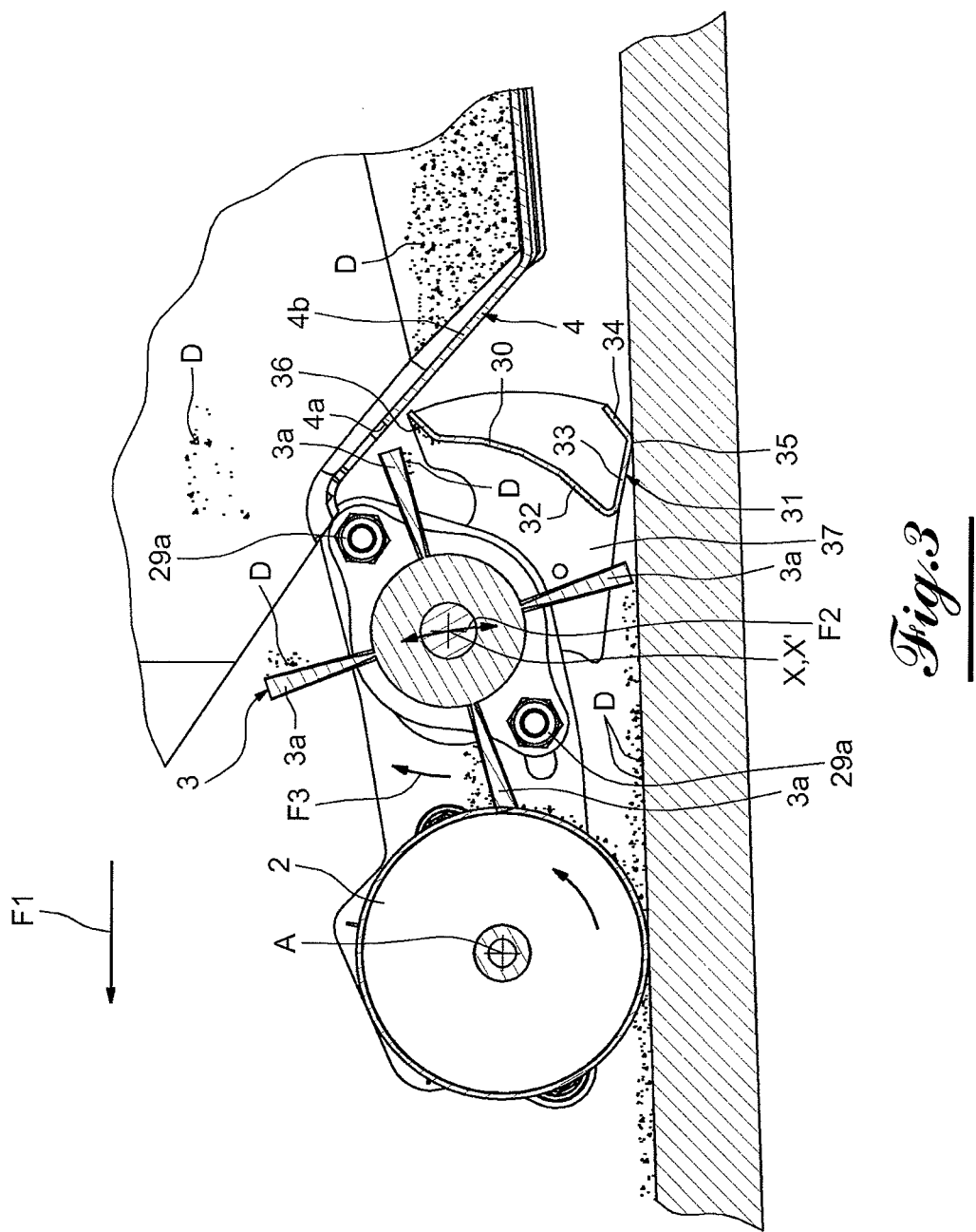
FIG. 3 is a cross-sectional view along line III-III of FIG. 1.
Figure 4:
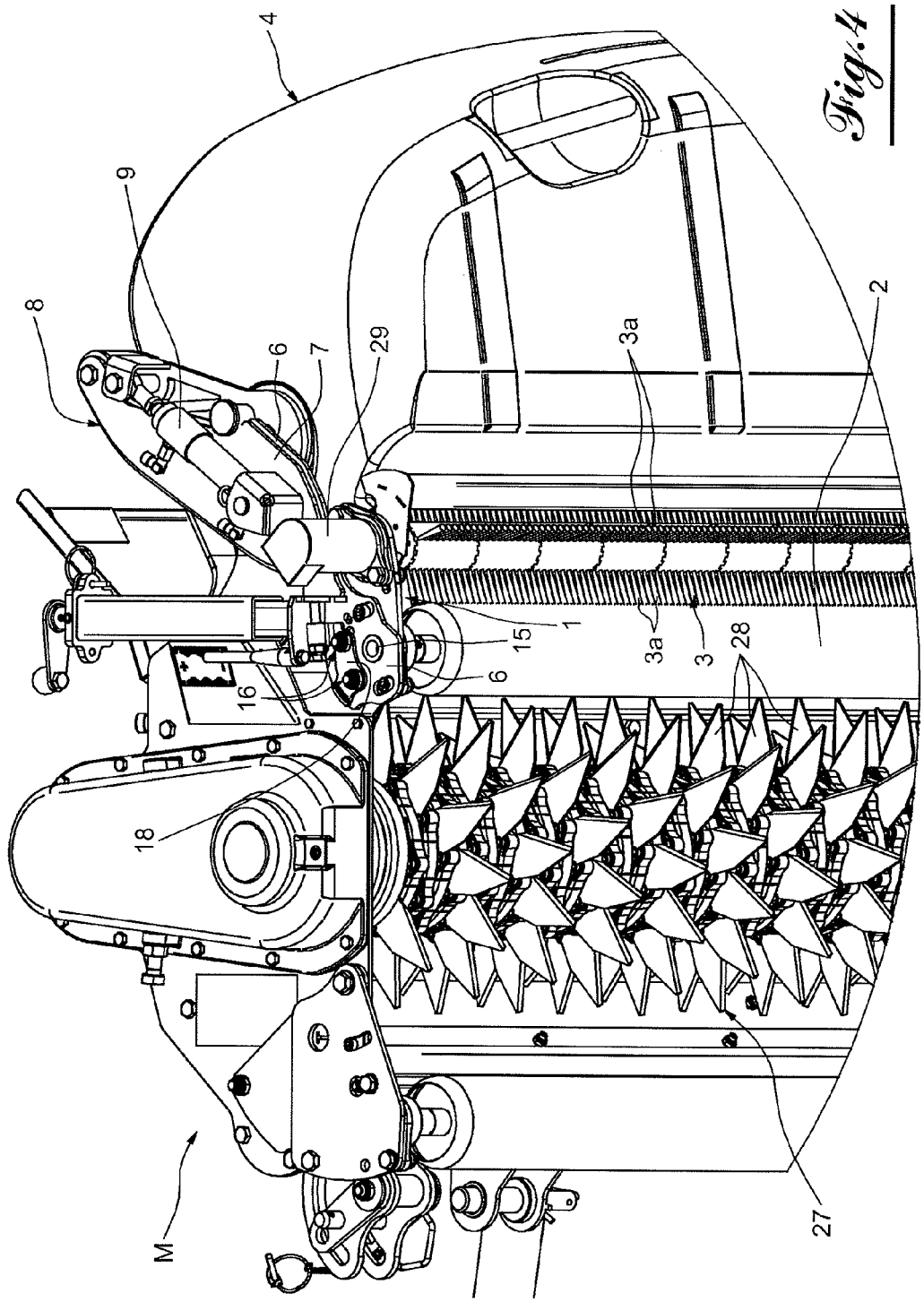
FIG. 4 is a perspective bottom view along arrow IV of FIG. 2.

The role of the bowed plate 30, during successive sweepings by the bristles 3a of the cylindrical brush 3, is to pick up waste D not previously ejected by the cylindrical brush 3 in the collecting pan 4 and ensure the transfer of the waste D by the bristles 3a of the brush 3 toward the bottom of the bowed plate 30 so that it can then be picked up by the bristles 3a with other waste present on the ground in order to eject the waste as well as that picked up by the bristles 3 of the brush 3 on the roller 2, into the collecting pan 4. FIG. 3 thus shows waste D present on a row of bristles 3a just upstream of the curved wall 36 of the bowed plate 30 considering the clockwise direction of rotation F3 of the brush 3 and that was not able to be ejected into the collecting pan 4 due to the relatively high speed of said brush. Thus, when the row of bristles 3a including the residual waste D comes into sweeping contact with the bowed plate 30, the latter part prevents the residual waste D from escaping radially from the row of bristles 3a to prevent it from being propelled onto the ground behind the brush 3 and said plate from retaining the residual waste D up to its lower edge from which the row of bristles 3a, through the relatively high rotational speed of the brush 3, can keep the residual waste D until it is ejected upwardly and rearwardly into the collecting pan 4 by the centrifugal force.

The bowed upper wall 36 being situated approximately below the lower edge 4a of the inlet opening of the waste ejected D by the brush 3, it prevents the passage of residual waste not ejected into the pan 4 between the upper edge of the wall 36 and the opposite wall 4b of the pan 4 comprising the lower edge 4a of the inlet opening of the waste in the pan.

The bowed plate 30 thus participates in an effective and complete cleaning of the ground while allowing the bristles 3a of the brush 3 to pick up all of the waste present on the ground just upstream of the lower portion of the bowed plate 30.

The bristles 3a of the cylindrical brush 3, instead of being arranged in a line or row as shown in the Figures, can be made up of several circular portions parallel to each other along the longitudinal axis of the cylinder or be arranged helically along that cylinder. The bristles 3a of the brush 3 can be formed by sections of bristles in lines alternating along the brush 3, i.e. regularly angularly staggered along the latter. Alternatively, the bristles 3a of the brush 3 can be arranged in a chevron pattern.

The invention claimed is:

1. A cleaning apparatus comprising:
a chassis;
a roller mounted on the chassis for rolling on turf and having an axis of rotation of the roller;
a cylindrical brush mounted on the chassis, parallel to the roller, and rotating in a direction opposite rotation of the roller, about an axis of rotation of the cylindrical brush, for picking up waste from the turf;
a collecting pan integral with the chassis, wherein
the cylindrical brush is located between the roller and the collecting pan,
the collecting pan includes an opening having a lower edge and the cylindrical brush, in rotating, projects the waste picked up from the turf into the collecting pan through the opening, and
the cylindrical brush is in contact with the roller to clean waste picked up from the turf and deposited on the roller; and
a bowed plate structure mounted on the chassis between the cylindrical brush and the collecting pan, wherein the bowed plate structure includes
a bowed plate opposite, facing, and having a curvature concentric with the cylindrical brush, located between the cylindrical brush and the collecting pan, and extending longitudinally along substantially all of the cylindrical brush, wherein
the bowed plate is swept by the cylindrical brush when the cylindrical brush rotates, and
the bowed plate structure is pivotally mounted on the chassis and freely pivots in relation to the chassis, around the axis of rotation of the cylindrical brush,
an upper wall contiguous, at a first bend, with an upper part of the bowed plate, located between the upper part of the bowed plate and the lower edge of the opening of the collecting pan, and directly beneath the lower edge of the opening in the collecting pan, and inclined toward the bowed plate with respect to the cylindrical brush so that the waste projected by the cylindrical brush toward the collecting pan and not entering the opening in the collecting pan falls toward and onto the upper wall and is directed down the bowed plate so that the waste not collected in the collecting pan may be picked up and projected a second time by the cylindrical brush toward the opening in the collecting pan,
a lower wall contiguous, at a second corner, with a lower part of the bowed plate, inclined away from the bowed plate, and extending away from the lower part of the bowed plate with respect to the cylindrical brush, and an upwardly curved end wall contiguous, at a rounded corner, to and extending from the lower wall, opposite and facing part of the bowed plate, wherein the rounded corner rests on the turf when the turf is being cleaned and confines the waste that has been directed down the bowed plate so that the waste may be picked up a second time by the cylindrical brush.

2. The apparatus according to claim 1, wherein the bowed plate structure further includes two side end walls pivotably mounted to the chassis and pivoting around the axis of rotation of the cylindrical brush.

3. The apparatus according to claim 1, including a structure for adjusting working height of the cylindrical brush, relative to the chassis and the turf being cleaned, along an arcuate path having a center situated on the axis of rotation of the roller.

4. The apparatus according to claim 1, wherein the roller and the cylindrical brush extend transverse to a direction of movement of the apparatus when cleaning the waste from the turf.

5. The apparatus according to claim 1, wherein the bowed plate structure is sheet metal.

* * * * *